June 15, 1937.    H. E. SHENEHON    2,083,673
HEADLIGHT INDICATOR AND ORNAMENT
Filed May 22, 1936

Inventor
HOWARD E. SHENEHON
By Chas. C. Reif
Attorney

Patented June 15, 1937

2,083,673

UNITED STATES PATENT OFFICE 2,083,673

HEADLIGHT INDICATOR AND ORNAMENT

Howard E. Shenehon, Minneapolis, Minn.

Application May 22, 1936, Serial No. 81,182

4 Claims. (Cl. 240—8.4)

This invention relates to a vehicle headlight and particularly to an automobile headlight having an ornamental means thereon which acts as an indicator to the driver that the headlights are illuminated.

The modern automobile headlights are now of elongated elliptical form at their rear ends and the front or lens parts of the headlights have their surfaces forming a continuation of the surface of the headlight casing and are rounded so as to be substantially semi-spherical. There is thus no break in surface or contour between the surface of the headlight casing and lens. The outline or surface is continuous and the whole together forms a sort of bullet-shaped member. It is to such a modern headlight that the present invention relates.

It is an object of this invention to provide a member which will constitute both a stream-line ornament of pleasing appearance and will at the same time form an indicator for indicating to the driver of the automobile that the headlights are lighted.

It is a further object of the invention to provide a structure of automobile headlight in which an elongated member of comparatively narrow width extends longitudinally and centrally of the elongated elliptical rear portion of the headlight and has its front end extending a short distance over and downwardly upon the lens portion of the headlight, said member having its greatest thickness adjacent its front end and being made of translucent material whereby the light from said lens will illuminate the body of said member so that said illumination may be observed by the driver of the automobile.

It is still another object of the invention to provide a headlight casing and lens of the elongated bullet-shaped type with such a member as set forth in the preceding paragraph, which member engages the headlight casing and lens and is preferably secured thereto by an adhesive.

These and other objects and advantages of the invention will be fully set forth in the following description made in connection with the accompanying drawing, in which like reference characters refer to similar parts throughout the several views and in which:—

Figure 1:
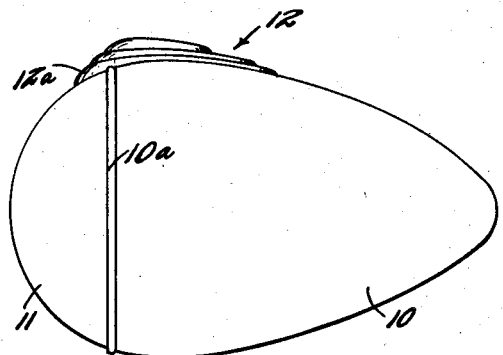
Fig. 1 is a view in side elevation of a headlight casing and lens embodying the invention.
Figure 2:
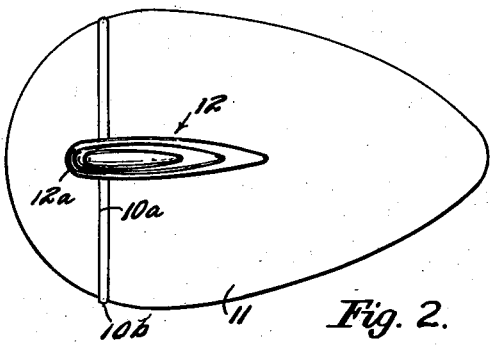
Fig. 2 is a top plan view of the device shown in Fig. 1.

Referring to the drawing, in Fig. 1 a headlight casing 10 is shown which is formed as one end of an elongated ellipsoid. Said casing terminates in a vertical plane indicated by line 10a and the lens forming part 11 of the headlight is of substantially semi-spherical form and its surface is substantially flush with and forms an approximate continuation of the surface of casing 10 so that the combined device including members 10 and 11 has a continuous outline and might be said to be substantially bullet-shaped. A small bead 10b is shown which does not appreciably change said outline. The described form of headlight casing and lens is that now commonly used on modern automobiles.

In accordance with the present invention a member 12 is provided which is disposed on top of casing 10 and centrally thereof transversely. Member 12 will be made of some translucent material or of a material penetrable by light, and while many materials might be used, any one of the modern translucent plastic compositions, such as the artificial resin materials, is preferable. Member 12 is of elongated form and tapers toward its rear end. At its front end it has a portion 12a which extends over and a short distance downwardly on the lens portion 11 of the headlight. Member 12 is shown as made of a plurality of layers or portions, each of which is smaller than the one which it overlies so that said member tapers upwardly toward a central longitudinal vertical plane. Each of said layers or formations tapers in vertical thickness rearwardly so that the greatest thickness or height of member 12 is adjacent its front end.

The member 12 forms a very ornamental device for the headlight and harmonizes with the elongated tapered form thereof so that it is in effect stream-lined. When the headlight is lighted, some of the rays passing through the lens 11 will pass into member 12 and the body thereof which is permeable to light will be illuminated and this illumination can be observed by the driver of the automobile. Said member will thus form an indicator to inform the driver when the headlights are lighted.

Figure 3:
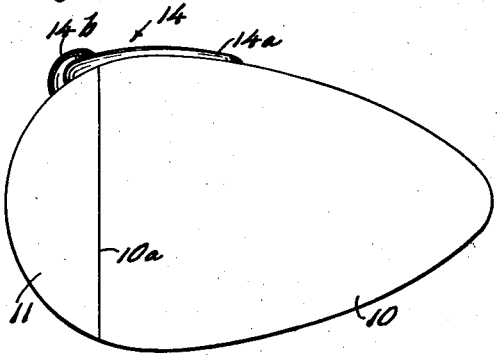
Fig. 3 is a view similar to Fig. 1 showing a modified form of the invention.
Figure 4:
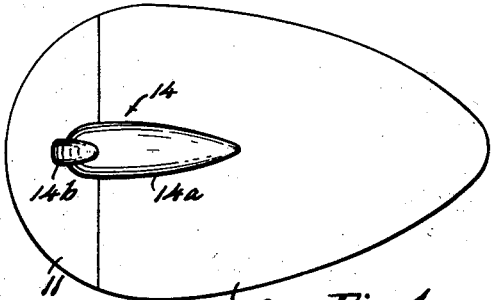
Fig. 4 is a top plan view of the device shown in Fig. 3.

In Figs. 3 and 4 the casing 10 and lens portion 11 are also shown. A member 14 of translucent material or material permeable by light is also shown. Member 14 has a portion 14a extending centrally at the top of and longitudinally of casing 10, the same being rounded in transverse cross section and tapering to a rounded point at its rear end. Another portion 14b is integral with and overlies portion 14a at its forward end. The forward end of portion 14a extends over and a short distance downwardly on the lens portion 11 and portion 14b also extends onto and in contact with lens portion 11 and then upwardly and over the front end of portion 14a. Portion 14b has its greatest thickness and width at its lower front end and tapers to a rounded point toward its rear end.

Member 14 also constitutes a very desirable streamlined ornament for the headlight and it will also act as an indicator that the headlight is lighted. The rays of light passing through lens 11 will illuminate the front end of member 14 and this illumination will be transmitted back into member 14 so as to be observable by the driver of the automobile.

Figure 5:
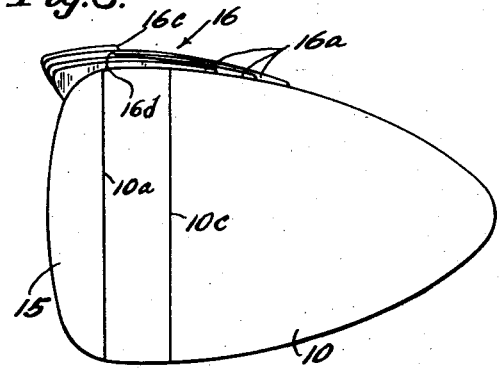
Fig. 5 is a view in side elevation of another modified form of the invention.
Figure 6:
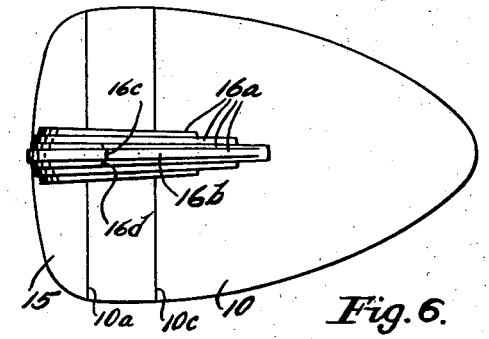
Fig. 6 is a top plan view of the device shown in Fig. 5.

In Figs. 5 and 6 the casing 10 is shown and a lens portion 15 of slightly different form than lens portion 11 is shown. Lens portion 15 has a rounded but somewhat flatter front portion than lens 11 but its surface is flush with and forms a continuation of the surface of casing 10 so that members 10 and 15 form a body of continuous outline. A band between lines 10a and 10c is shown which may be plated or finished in a different color than the remainder of casing 10. A member 16 is provided which will be made of the same material as already described for members 12 and 14. Member 16 has its greatest thickness in height at its front end where it extends a short distance over and downwardly on lens portion 15. Said member tapers in thickness rearwardly to its rear end. Member 16 also tapers in width toward its rear end and is formed with a plurality of steps or layers 16a, each of which is narrower than the one which it overlies. The central rib or layer 16b has a downwardly extending offset 16c adjacent its front end and the adjacent step or layer at each side of said central rib or layer has a similar downwardly and rearwardly inclined offset 16d. The central rib 16b at its rear end has its top surface merging into the top surface of the adjacent side steps or layers. The layers or steps of member 16 terminate at different distances from the front of said member, the lower layer terminating nearest the front and the upper steps or layers terminating farther from the front of said member.

The use and operation of the device shown in Figs. 5 and 6 is substantially the same as those shown in Figs. 1 to 4. The light from the lens will illuminate the body of member 16 so that the illumination can be observed by the driver who will then know that the headlight is lighted. Member 16 also forms a highly ornamental stream-lined device for the headlight.

From the above description it is seen that applicant has provided a simple and ingenious headlight device which not only greatly adds to the appearance of the car but also forms a headlight indicator. The members 12, 14 and 16 may be made of different colors to suit the particular color used in the finish of the automobile. The designs can also be varied for the different types of automobiles. While said members may be secured in various ways, they will preferably be secured to the headlight by a suitable adhesive. Said members are in engagement with the headlight and appear as an integral part thereof. The invention will thus have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. The combination with an automobile headlight casing of elongated tapering form having its end in a substantially vertical plane and a lens of substantially semi-spherical form having its surface substantially flush with and forming a substantial continuation of the surface of said casing, of an elongated comparatively narrow member of translucent material extending longitudinally along the top of said casing centrally thereof and having a portion extending onto and a short distance downwardly over the front of said lens, said member having a lower surface conforming to the surface of said casing and lens and being secured directly thereto whereby the light from said lens will illuminate the body of said member so as to be seen by the driver and whereby an ornament is provided.

2. The combination with an automobile headlight casing and lens of circular form in transverse cross section and having a substantially continuous surface with a rounded front and of elongated tapered form at its rear end, of an elongated ornamental member made of material permeable by light and of comparatively narrow width extending longitudinally at the top of said casing and extending downwardly a short distance on said lens, said member having its thickest portion adjacent its front end and tapering rearwardly both in thickness and in width, said member having a lower surface conforming to the surface of said casing and lens and directly engaging and directly secured to said casing and lens whereby said member will be illuminated by light passing through said lens and its illumination can be observed by the driver of said automobile.

3. The combination with an automobile headlight casing having the shape of one end of an elongated ellipsoid and having a lens portion at one end with its surface extending substantially continuous with the surface of said casing and having a rounded front end of an elongated member made of material permeable by light disposed on the top of said casing and tapering toward its rear end, said member extending over and a short distance downwardly on said lens and having a lower surface conforming to the surface of said casing and lens and being directly secured to said casing by adhesive, said member tapering upwardly in width whereby said member will be illuminated by light passing through said lens and its illumination can be observed by the driver of said automobile.

4. The combination with an automobile headlight casing having the shape of one end of an elongated ellipsoid and having a lens portion at one end with its surface extending therefrom and having a rounded front of an elongated narrow member made of material permeable by light, disposed on the upper side of said casing and extending longitudinally thereof and a short distance over and downwardly upon said lens, said member having a lower surface conforming to the surface of said casing and lens and means directly securing said member in position on said casing whereby said member will be illuminated and such illumination may be seen by the driver of the automobile.

HOWARD E. SHENEHON.